(12) United States Patent
Tanaka et al.

(10) Patent No.: US 6,355,375 B2
(45) Date of Patent: *Mar. 12, 2002

(54) ALKALINE BATTERY SEPARATOR AND PROCESS FOR PRODUCING THE SAME

(75) Inventors: Masanao Tanaka; Nobutoshi Tokutake, both of Ibaraki (JP)

(73) Assignee: Japan Vilene Company Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/515,540

(22) Filed: Feb. 29, 2000

Related U.S. Application Data

(63) Continuation of application No. 09/061,449, filed on Apr. 16, 1998, now Pat. No. 6,037,079.

(30) Foreign Application Priority Data

Apr. 17, 1997 (JP) ............................................. 9-115145
May 13, 1997 (JP) ............................................. 9-139355
May 13, 1997 (JP) ............................................. 9-139356

(51) Int. Cl.[7] ................................................. H01M 2/16
(52) U.S. Cl. ........................ 429/142; 429/144; 429/247; 429/249; 429/250; 429/251; 429/253; 429/254; 429/206
(58) Field of Search ................................ 429/142, 144, 429/247, 250, 249, 251, 253, 254, 206

(56) References Cited

U.S. PATENT DOCUMENTS

| 4,330,602 A | * | 5/1982 | O'Rell et al. ............... 429/206 |
| 5,213,722 A | * | 5/1993 | Iwasaki et al. ............... 264/22 |
| 5,609,976 A | | 3/1997 | Ueda et al. |

OTHER PUBLICATIONS

Patent Abstract of JPP 61–281454, Dec. 11, 1986.
Patent Abstract of PP 9–223492, Aug. 26, 1997.
Patent Abstract Publication No. 08273650, Oct. 1996.
European Search Report, Jul. 1999.

* cited by examiner

*Primary Examiner*—Gabrielle Brouillette
*Assistant Examiner*—Angela J. Martin
(74) *Attorney, Agent, or Firm*—Darby & Darby

(57) ABSTRACT

An alkaline battery separator comprising a nonwoven fabric containing one or more mixture layers of entangled short fibers and entangled long fibers, wherein a fiber length of the short fibers is from 1 mm to less than 25 mm, a fiber length of the long fibers is 25 mm or more, and a total thickness of all of the mixture layers accounts for not less than one-third of a whole thickness of the nonwoven fabric is disclosed. The alkaline battery separator according to the present invention exhibits an excellent electrolyte-holding capacity, tensile strength, tear strength and bending resistance, and can be used to stably prepare a battery. Electrode flash rarely penetrate the separator, to thereby cause a short circuit between electrodes.

23 Claims, 2 Drawing Sheets

ALKALINE BATTERY SEPARATOR AND PROCESS FOR PRODUCING THE SAME

This is a continuation of application Ser. No. 09/061,449 filed: Apr. 16, 1998 U.S. Pat. No. 6,037,079 by Masanao TANAKA, et al for ALKALINE BATTERY SEPARATOR AND PROCESS FOR PRODUCING THE SAME.

BACKGROUND OF THE INVENTION

1. Field of the Invention

The present invention relates to an alkaline battery separator, i.e., a separator for an alkaline battery, and a process for producing the same.

2. Description of the Related Art

In an alkaline battery, a separator is used between a positive electrode and a negative electrode to separate them and to prevent a short circuit therebetween, and further, to hold an electrolyte thereon and enable a smooth electromotive reaction.

Recently, the space allotted for the battery has become smaller in electronic equipment, due to the need for miniaturization and weight-saving. Nevertheless, the performance requirement for such a smaller battery is the same as or higher than that for a conventional battery, and therefore, it is necessary to increase the capacity of the battery, and to increase the amounts of active materials in the electrodes. Thus, the volume allotted in the battery for the separator must be reduced, and the thickness of the separator must be made thinner. However, if a conventional separator is simply thinned, the capacity thereof for holding an electrolyte (i.e., the electrolyte-holding capacity) is lowered, and a dispersibility of fibers is liable to become lower. Therefore, Japanese Unexamined Patent Publication (Kokai) No. 7-29561 and Japanese Unexamined Patent Publication (Kokai) No. 8-138645, for example, disclose that the electrolyte-holding capacity and the dispersibility of fibers can be enhanced by forming a fiber web by a wet-laid method, using dividable composite fibers capable of producing fine fibers having a linear density of 60 $\mu$g/m or less. The separators disclosed in these Japanese Publications have an advantageous electrolyte-holding capacity and dispersibility of fibers, but are liable to be broken by the tension generated during a step of assembling electrodes during battery production. Further, an electrode flash and an active material may break and penetrate the separator, to thus cause a short circuit between the electrodes, and therefore, the yield is poor. Further, the separators have low tear-strength and low bending resistance which also lowers the yield.

SUMMARY OF THE INVENTION

Accordingly, the object of the present invention is to remedy the above disadvantages of the prior art, and to provide an alkaline battery separator having excellent electrolyte-holding capacity, tensile strength, tear strength, and bending resistance, and ability to be used to stably produce a battery, and wherein an electrode flash rarely breaks the separator to cause a short circuit between the electrodes.

Other objects and advantages of the present invention will be apparent from the following description.

In accordance with the present invention, there is provided an alkaline battery separator comprising a nonwoven fabric containing one or more mixture layers of entangled short fibers and entangled long fibers, wherein the fiber length of the short fibers is from 1 mm to less than 25 mm, the fiber length of the long fibers is 25 mm or more, and the total thickness of all of the mixture layers accounts for not less than one-third of the whole thickness of the nonwoven fabric.

Further, in accordance with the present invention, there is provided a process for producing an alkaline battery separator comprising the steps of laminating at least one fiber web of short fibers and at least one fiber web of long fibers, a fiber length of the short fibers being from 1 mm to less than 25 mm, and the fiber length of the long fibers being 25 mm or more; and entangling the resulting laminate to form one or more mixture layers of short fibers of the fiber web of short fibers entangled with long fibers of the fiber web of long fibers so that the total thickness of all of the mixture layers accounts for not less than one-third of a whole thickness of the nonwoven fabric.

DESCRIPTION OF THE PREFERRED EMBODIMENTS

Figure 1:
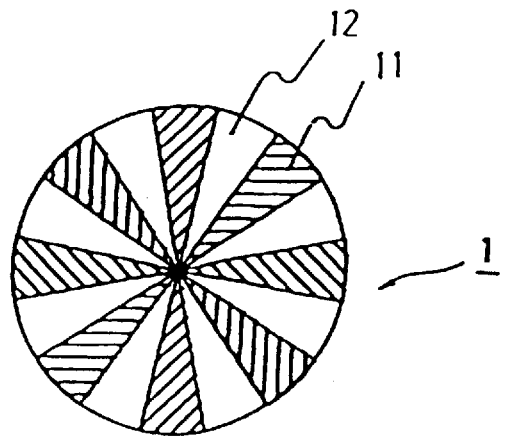
FIG. 1 is a sectional view schematically illustrating a dividable composite fiber which may be used for the alkaline battery separator according to the present invention.

The alkaline battery separator of the present invention comprises a nonwoven fabric containing at least one mixture layer of entangled short fibers and entangled long fibers, wherein the fiber length of the short fibers is from 1 mm to less than 25 mm and the fiber length of the long fibers is 25 mm or more. Further, a thickness of the mixture layer, or if the nonwoven fabric contains two or more mixture layers, the sum of the thicknesses of the mixture layers accounts for not less than one-third of the whole thickness of the nonwoven fabric.

The term "mixture layer" as used herein means a layer wherein short fibers having a fiber length of 1 mm to less than 25 mm and long fibers having a fiber length of 25 mm or more are entangled and admixed with each other. The mixture layer may be prepared by, for example, laminating a fiber web of short fibers having a fiber length of 1 mm to less than 25 mm (hereinafter sometimes referred to as "a short fiber web) and a fiber web of long fibers having a fiber length of 25 mm or more (hereinafter sometimes referred to as "a long fiber web), and then entangling the resulting laminate once or more times. The mixture layer can be clearly distinguished from a layer composed of only short fibers and a layer composed of only long fibers by, for example, observing a sectional view of the separator through a microscope. For example, when a section of a nonwoven fabric comprising one or more layers composed of only short fibers, one or more mixture layers, and one or more layers composed of only long fibers is examined through a microscope, a boundary between the layer composed of only short fibers and the mixture layer, and a boundary between the layer composed of only long fibers and the mixture layer can be clearly observed.

As long as the nonwoven fabric constituting the separator of the present invention contains at least one mixture layer, and the total thickness of the mixture layers accounts for not less than one-third of a whole thickness of the nonwoven fabric, for example, the number of the mixture layers is not limited, and the presence or absence of layers (such as the layer of only short fibers or the layer of only long fibers) other than the mixture layer, the arrangement of one or more mixture layers and other layers, or a kind of the mixture layers and/or other layers (for example, a kind of constitutional fibers), is not limited.

The nonwoven fabric constituting the separator of the present invention may be produced by, for example, laminating a short fiber web and a long fiber web, and then entangling the resulting laminate, as explained below, and therefore, examples of layers other than the mixture layer are a layer of entangled short fibers (i.e., a layer consisting of only short fibers having a fiber length of 1 mm to less than 25 mm), or a layer of entangled long fibers (i.e., a layer consisting of only long fibers having a fiber length of 25 mm or more). For example, when a short fiber web and a long fiber web are laminated and entangled, there may be obtained a nonwoven fabric wherein a short-fiber layer, a mixture layer and a long-fiber layer are arranged in that sequence, a nonwoven fabric containing a short-fiber layer and a mixture layer, a nonwoven fabric containing a long-fiber layer and a mixture layer, or a nonwoven fabric containing only a mixture layer, depending on a thickness of the short fiber web and the long fiber web, and a condition of the entangling treatment. In the mixture layer, an electrolyte may be more uniformly distributed than in the short-fiber or long-fiber layer. Therefore, a preferable nonwoven fabric constituting the separator of the present invention contains one or more mixture layers at a higher ratio to the nonwoven fabric. A nonwoven fabric containing one or more mixture layers such that the thickness of the mixture layers accounts for two-thirds or more of a whole thickness of the nonwoven fabric is more preferable, and a nonwoven fabric composed only of the mixture layer is most preferable.

The short fiber constituting the short fiber web used in the preparation of the alkaline battery separator according to the present invention has a fiber length of 1 mm to less than 25 mm, as short fibers having a fiber length of 1 mm to less than 25 mm exhibit an excellent fiber dispersibility. If the fiber length is outside of the above range, it may become difficult to form a uniform fiber web, or the fiber dispersibility may become poor. The fiber length of the short fiber constituting the short fiber web is preferably 5 to 20 mm, more preferably 10 to 20 mm.

The long fiber constituting the long fiber web used in the preparation of the alkaline battery separator according to the present invention has a fiber length of not less than 25 mm. Long fibers having a fiber length of 25 mm or more can enhance a tensile strength, tear strength and bending resistance of the separator. If the fiber length is less than 25 mm, the tensile strength, tear strength and bending resistance of the separator may not be sufficiently enhanced. The fiber length of the long fiber constituting the long fiber web is preferably 25 to 110 mm, more preferably 25 to 60 mm.

Preferably one of the short fiber web or the long fiber webs, more preferably both, contain (1) dividable composite fibers capable of producing polyolefin fine fibers (hereinafter sometimes referred to as "dividable composite fibers"), (2) high-strength fibers having a single-fiber strength of 5 g/denier or more, and (3) fusible fibers containing at least on a surface thereof a resin component having a melting point lower than the melting point of the dividable composite fibers and lower than the melting point of the high-strength fibers.

When the nonwoven fabric which is a constitutional component of the alkaline battery separator of the present invention contains polyolefin fine fibers, the electrolyte-holding capacity can be enhanced. The polyolefin fine fibers can be formed from the dividable composite fibers capable of producing polyolefin fine fibers, i.e., dividable composite fibers, by a physical action, such as an action of a water jet, and/or a chemical action, such as removal of resin components with a solvent.

The dividable composite fiber (i.e., the dividable composite short fiber and/or the dividable composite long fiber) which may be used for the alkaline battery separator according to the present invention, is composed of two or more resin components (at least one of the resin components is a polyolefin resin component) which are orientated almost in parallel with a lengthwise direction of the dividable composite fiber, in such a manner that the different resin components are brought into contact with each other. The dividable composite fiber may be divided into fine fibers of different resin components by a treatment with a water jet or the like.

Figure 2:
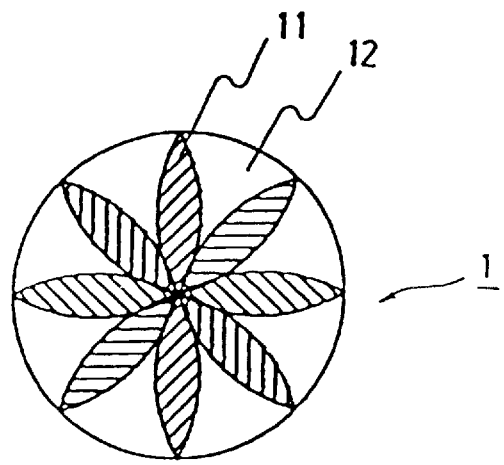
FIG. 2 is a sectional view schematically illustrating another dividable composite fiber which may be used for the alkaline battery separator according to the present invention.
Figure 3:
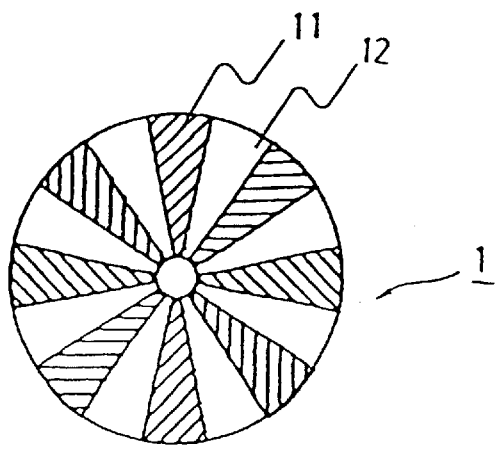
FIG. 3 is a sectional view schematically illustrating still another dividable composite fiber which may be used for the alkaline battery separator according to the present invention.
Figure 4:
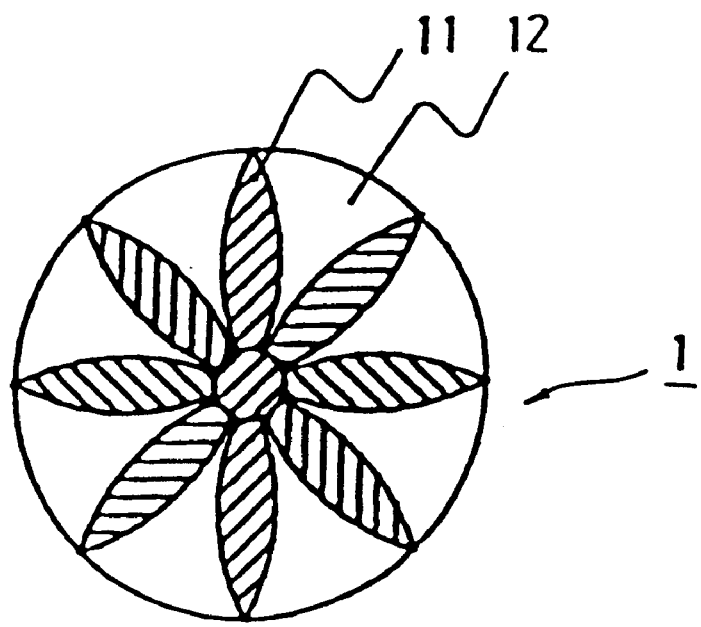
FIG. 4 is a sectional view schematically illustrating still another dividable composite fiber which may be used for the alkaline battery separator according to the present invention.
Figure 5:
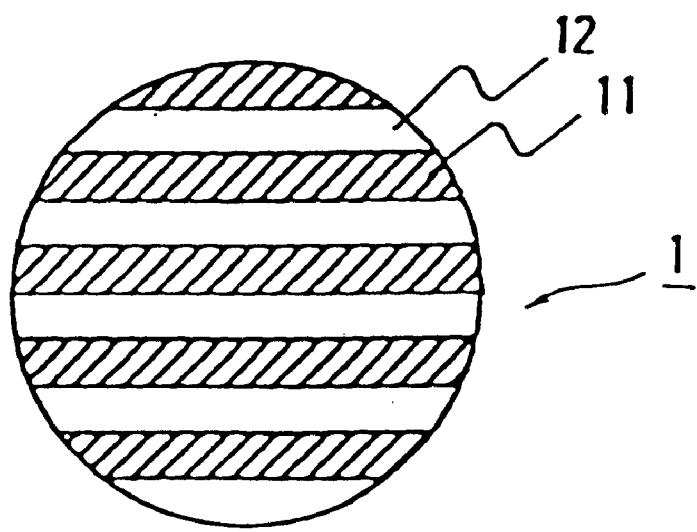
FIG. 5 is a sectional view schematically illustrating still another dividable composite fiber which may be used for the alkaline battery separator according to the present invention.

The arrangement of the resin components in the dividable composite fiber which may be used for the alkaline battery separator of the present invention, is not limited. Examples of the arrangement of resin components when the dividable composite fiber is composed of two resin components, will be described with reference to the drawings. FIGS. 1 and 2 illustrate a dividable composite fiber 1 which is composed of a resin component 11 and a different resin component 12 and has a cross-sectional structure wherein the components are divided each other by straight lines (FIG. 1) or curved lines (FIG. 2) radiating from the center portion; FIGS. 3 and 4 illustrate a dividable composite fiber 1 which is composed of a resin component 11 and a different resin component 12 and has a cross-sectional structure wherein the components are divided by straight lines (FIG. 3) or curved lines (FIG. 4) radiating from the center portion, and one of the resin components 11 and 12 is located in the center portion; and FIG. 5 illustrates a dividable composite fiber 1 having a cross-sectional structure wherein resin components 11 and 12 are laminated. The dividable composite fibers having the cross-sectional structures as shown in FIGS. 1 to 4 are preferable, because of a uniformity in the diameter of the fine fibers derived therefrom.

The dividable composite fiber preferably consists essentially of two or more polyolefin resin components. When a polyolefin dividable composite fiber essentially consisting of two or more polyolefin resin components is used, a resistance to alkalis may be enhanced in a resulting separator.

The polyolefin resin components of the dividable composite fiber may be, for example, polyethylene, polypropylene, polymethylpentene, ethylene-propylene copolymer, ethylene-butene-propylene copolymer, or ethylene-vinyl alcohol copolymer. The polyolefin dividable composite fiber may contain one or more polyolefin resin components together with one or more other resin components, particularly only two or more polyolefin resin components. Of these resin components, polypropylene or polyethylene, which exhibits an excellent resistance to alkalis and acids, is preferable. The combination of the polyolefin resin components is not limited, but the combination of polyethylene and polypropylene is preferable, and the combination of high-density polyethylene and polypropylene is more preferable, because of an excellent resistance thereof to alkalis and acids.

An ethylene-vinyl alcohol copolymer has an excellent electrolyte-holding capacity. When the dividable composite fiber containing an ethylene-vinyl alcohol copolymer as one of the polyolefin resin components is used, the electrolyte-holding capacity in the resulting separator is enhanced. Thus the absorbability of oxygen in an overcharged state, and the performance with respect to an internal pressure of the battery, can be improved. It is preferable to combine the ethylene-vinyl alcohol copolymer, which improves the internal pressure performance, with a polypropylene having an excellent resistance to alkalis. When a combination of (1) a first dividable composite fiber capable of producing ethylene-vinyl alcohol copolymer fine fibers and one or more other polyolefin fine fibers, i.e., a first polyolefin dividable composite fiber, and (2) a second dividable composite fiber capable of only producing two or more polyolefin fine fibers excepting ethylene-vinyl alcohol copolymer fine fibers, i.e., a second polyolefin dividable composite fiber, is used as the dividable composite fiber in the separator, the resistance to alkalis and the electrolyte-holding capacity thereof can be further enhanced.

The resin component other than polyolefin resin components in the dividable composite fiber is, for example, a polyamide resin component, such as nylon 6, nylon 66 or nylon 12, or a polyvinyl acetate resin component.

When the linear density of the fine fiber decreases, the electrolyte-holding capacity in the separator can be further improved, and a needle-like deposition can be more effectively prevented. In this respect, the linear density of the fine fiber is preferably 45 µg/m or less. On the other hand, to ensure a certain degree of fiber strength, the linear density of the fine fiber is preferably 1 µg/m or more. Therefore, the linear density of the fine fiber is more preferably 2.5 to 35 µg/m.

The fine fibers may be produced by dividing the dividable composite fibers by a physical action and/or a chemical action. The physical action includes, for example, a fluid jet such as a water jet, needle punching, calendering, or flat pressing. Of the above treatments, the fluid jet is the preferable physical action, because a dividing of the dividable composite fibers and an entangling of the fibers as mentioned below can be carried out simultaneously. The chemical action is, for example, a removal or swelling of one or more resin components with a solvent, or the like.

The content of the dividable composite fibers (including the dividable composite short fibers and the dividable composite long fibers) which may be used for the alkaline battery separator of the present invention is not limited. The dividable composite fibers may account for preferably 35 to 50 mass %, more preferably 35 to 45 mass %, with respect to the total mass of the constitutional fibers of the nonwoven fabric. If the content is less than 35 mass %, a sufficient electrolyte-holding capacity cannot be always obtained. If the content is more than 50 mass %, the ratios of other fibers drop, and thus the tensile and the breaking strengths may be lowered. When a combination of (1) the first polyolefin dividable composite fiber capable of producing ethylene-vinyl alcohol copolymer fine fibers and one or more other polyolefin fine fibers, and (2) the second polyolefin dividable composite fiber capable of only producing two or more polyolefin fine fibers excepting ethylene-vinyl alcohol copolymer fine fibers is used as the dividable composite fiber (including the dividable composite short fiber and the dividable composite long fiber), the first polyolefin dividable composite fiber may account for preferably 5 to 40 mass %, more preferably 5 to 35 mass %, most preferably 10 to 30 mass %, and the second polyolefin dividable composite fiber may account for preferably 10 to 45 mass %, more preferably 10 to 40 mass %, most preferably 15 to 35 mass %, with respect to the total mass of the constitutional fibers of the nonwoven fabric, respectively.

When the nonwoven fabric composed of the alkaline battery separator of the present invention contains the high-strength fibers (including the high-strength short fibers and the high-strength long fibers) having a single-fiber strength (tensile strength) of 5 g/denier or more, the intrusion of electrode flashes into the separator can be prevented and a short circuit between the electrodes is prevented, when the battery is assembled using the separator. If the single-fiber strength is less than 5 g/denier, a short circuit cannot be sufficiently prevented. Therefore, it is preferable to use the high-strength fiber having a single-fiber strength of 7 g/denier or more, more preferably 9 g/denier. The single-fiber strength is measured in accordance with JIS (Japanese Industrial Standard) L1015, a testing method for chemical staple fibers.

The high-strength fiber is not limited, as long as it has a single-fiber strength of 5 g/denier or more. As the high-strength fiber, general-purpose synthetic fibers such as polypropylene, polyethylene, or polyamide, may be used. It is preferable to use, as the high-strength fiber, a synthetic fiber containing, at least on the surface, one or more polyolefin resin components which are the same as those composed of the polyolefin fine fibers. Polypropylene or polyethylene may be preferably used as the resin component present on the surface, because of a long-term resistance thereof to alkalis and acids.

The linear density of the high-strength fiber is preferably 40 to 650 µg/m, to ensure that there is no reduction of the electrolyte-holding capacity.

It is preferable to use an ultra-high-strength polyethylene fiber (including an ultra-high-strength polyethylene short fiber and an ultra-high-strength polyethylene long fiber) having a single-fiber strength of 25 g/denier or more, more preferably 30 g/denier or more, as the high-strength fiber, because such an ultra-high-strength polyethylene fiber also has an excellent elasticity, and therefore, breakage of the separator caused by a tension applied during the assembly of the battery, a short circuit between electrodes via an electrode flash which penetrates through the separator from one electrode to another electrode, or tearing by an electrode edge are avoided.

The content of the high-strength fiber (including the high-strength short fiber and the high-strength long fiber) in the alkaline battery separator of the present invention is not limited, but the high-strength fiber is used in an amount of preferably 30 to 45 mass %, more preferably 30 to 40 mass %, most preferably 35 to 40 mass %, with respect to the total mass of the constitutional fibers of the nonwoven fabric. The battery performances (such as lifetime, internal pressure, or the like) of the alkaline battery separator of the present invention varies mainly in accordance to the amount of fine fibers derived from the dividable composite fibers and the fused condition of the fusible fibers. If the amount of the high-strength fibers is more than 45 mass %, a required battery performance cannot be always obtained. If the amount of the high-strength fibers is less than 30 mass %, a short circuit cannot be sufficiently prevented.

The amount of the ultra-high-strength polyethylene fiber (including the ultra-high-strength polyethylene short fiber and the ultra-high-strength polyethylene long fiber) having a single-fiber strength of 25 g/denier or more, more preferably 30 g/denier or more, which is used as the high-strength fiber, is preferably 1 to 45 mass %, more preferably 5 to 40 mass %, with respect to the total mass of the constitutional fibers of the nonwoven fabric. When the amount of the ultra-high-strength polyethylene fiber is less than 30 mass %, other high-strength fibers may be preferably added to adjust the total amount of the high-strength fibers to 30 to 45 mass % with respect to the total mass of the constitutional fibers of the nonwoven fabric.

When the nonwoven fabric composed of the alkaline battery separator of the present invention contains the fusible fibers (including the fusible short fibers and the fusible long fibers), the tensile strength and the bending resistance of the separator are enhanced. As the fusible fibers, those containing at least on a surface thereof a resin component having a melting point lower than melting points of the dividable composite fiber and the high-strength fiber are used, to avoid any reduction of the electrolyte-holding capacity due to the fine fibers produced from the dividable composite fibers, and of the strength of the high-strength fibers. The component is sometimes referred to hereinafter as a low-melting-point component. The melting point of the low-melting-point component composed of the fusible fiber is lower than a melting point of the dividable composite fiber and the melting point of the high-strength fiber, by preferably 10° C. or more, more preferably 15° C. or more.

It is preferable to use the fusible fibers containing one or more resin components which are the same as those in the polyolefin fine fibers, for example, polyethylene, polypropylene, polymethylpentene, ethylene-propylene copolymer, or ethylene-butene-propylene copolymer, because of an excellent resistance to alkalis thereof. When the dividable composite fiber containing polyethylene and polypropylene is used, the polyethylene in the dividable composite fiber is preferably high-density polyethylene, and the low-melting-point component of the fusible fiber is preferably low-density polyethylene. The fusible fiber may be composed of a single component or two or more components. However, the fusible fiber composed of two or more components is preferable, because the tensile strength of the separator can be thus enhanced. The fusible fiber may be a wholly fusible fiber which consists essentially of a polyolefin fusible component, or a partially fusible fiber which contains two or more resin components and carries a polyolefin fusible component on a fiber surface. A wholly fusible fiber consisting essentially of a single component is, for example, polyethylene, or polypropylene fiber. As a partially fusible fiber composed of two or more resin components, there may be mentioned, for example, a sheath-core type, side-by-side type, sea-islands type, orange-like cross-sectional type, multiple bimetal type or eccentric type composite fiber.

The linear density of the fusible fiber is preferably 55 to 650 µg/m, to prevent a reduction of the electrolyte-holding capacity.

The content of the fusible fibers (including the fusible short fibers and the fusible long fibers) in the alkaline battery separator of the present invention is not limited. The fusible fibers may account for preferably 20 to 35 mass %, more preferably 20 to 30 mass % with respect to the total mass of the constitutional fibers of the nonwoven fabric. If the content is less than 20 mass %, the tensile strength or bending resistance may be lowered. If the content is more than 35 mass %, the ratios of the other fibers drop, and thus the electrolyte-holding capacity under pressure or the breaking strength may be lowered.

In the alkaline battery separator of the present invention, the contents of the dividable composite fibers (including the dividable composite short fibers and the dividable composite long fibers), the fusible fibers (including the fusible short fibers and the fusible long fibers) and the high-strength fibers (including the high-strength short fibers and the high-strength long fibers) in combination thereof are not limited. However, with respect to the total mass of the constitutional fibers of the nonwoven fabric, a combination of 35 to 50 mass % of the dividable composite fibers, 30 to 45 mass % of the high-strength fibers and 20 to 35 mass % of the fusible fibers is preferable, a combination of 35 to 45 mass % of the dividable composite fibers, 30 to 40 mass % of the high-strength fibers and 20 to 30 mass % of the fusible fibers is more preferable, and a combination of 35 to 45 mass % of the dividable composite fibers, 35 to 40 mass % of the high-strength fibers and 20 to 30 mass % of the fusible fibers is most preferable.

In addition to the polyolefin fine fibers, the high-strength fibers and the fusible fibers as above, the alkaline battery separator of the present invention may further contain dividable composite short and/or long fibers which may be undivided. If necessary, the separator of the present invention may further contain fourth short fibers and/or long fibers in addition to the above fibers. The fourth short fibers and/or long fibers preferably contain one or more polyolefin resin components which are the same as those of the fine fibers, because of an excellent resistance to alkalis thereof. The fourth short fibers and/or long fibers may account for preferably 15 mass % or less, more preferably 10 mass % or less, taking into account the ratio of the dividable composite short fibers and/or long fibers, the high-strength short fibers and/or long fibers, and the fusible short fibers and/or long fibers.

The mass ratio of the short fibers and long fibers constituting the nonwoven fabric used for the alkaline battery separator according to the present invention is preferably 20:80 to 80:20, more preferably 30:70 to 70:30, taking into account the excellent fiber dispersibility due to the short fibers, and the excellent tensile strength, tear strength, and bending resistance due to the long fibers.

The alkaline battery of the present invention is composed of a nonwoven fabric which may be produced, for example, by a process comprising the steps of (1) laminating at least one fiber web of short fibers having a fiber length of from 1 mm to less than 25 mm, and at least one fiber web of long fibers having a fiber length of 25 mm or more; and (2) entangling the resulting laminate to thereby form one or more mixture layers of entangled short fibers of the fiber web of short fibers and entangled long fibers of the fiber web of long fibers so that a total thickness of all of the mixture layers accounts for not less than one-third of the whole thickness of the nonwoven fabric, to thus obtain the nonwoven fabric which may be used as the separator.

As the method for preparing the short fiber web consisting of short fibers having the fiber length of 1 to less than 25 mm, preferably a wet-laid method is used, such as a horizontal wire type, a tilted wire type, a cylinder type, or a wire-cylinder combination type method. As the method for preparing the long fiber web consisting of long fibers having the fiber length of 25 mm or more, preferably a dry-laid method is used, such as a carding, spun-bonding, or air-laid method.

Thereafter, a laminate is formed from at least one short fiber web and at least one long fiber web. When a laminate containing three or more of the short and long fiber layers, i.e., a laminate containing two or more of the short fiber web and/or the long fiber web, is formed, the sequence of the short fiber webs and the long fiber webs is not limited but can be appropriately determined in accordance with the structure of the alkaline battery separator to be produced. More particularly, during the step of forming the mixture layer in the laminate of short fiber webs and long fiber webs, as explained below, the mixture layer is formed on both sides of a boundary between the short fiber web and the long fiber web in the laminate. For example, a non-woven fabric containing a mixture layer may be produced from a laminate wherein a first short fiber web, a second short fiber web and a long fiber web are laminated, in that order. Further, a nonwoven fabric containing two mixture layers may be produced from a laminate wherein a first short fiber web, a long fiber web and a second short fiber web are laminated in that order. In the latter case, the ratio of each mixture layer in the nonwoven fabric can be increased by raising the degree of entangling treatment, for example, treating the laminate with a fluid jet having a greater force, and when the degree of entangling treatment is higher than a predetermined level, two mixture layers may be integrated into a mixture layer in the nonwoven fabric.

When two or more short fiber webs and/or long fiber webs are laminated, preferably the short fiber webs are interleaved with long fiber webs so that the short fibers and the long fibers are thus uniformly entangled.

Subsequently, the resulting laminate is subjected to entangling treatment to form one or more mixture layers. As the entangling treatment, there may be mentioned, for example, a treatment with a fluid jet, such as a water jet, or a needle punching. Of the above treatments, the treatment with the fluid jet is preferable because the fibers can be more uniformly admixed. When the short fiber webs and/or the long fiber webs contain the dividable composite fiber, the dividable composite fiber can be divided during the entangling treatment although the dividing treatment can be separately performed. As the dividing treatment, there may be mentioned, for example, a needle punching, calendering, flat pressing treatment, or a treatment with a fluid jet. The sequence and/or number of entangling and dividing treatments are not limited, but can be appropriately determined.

When the treatment with a fluid jet is carried out as the entangling treatment, preferably the laminate is treated at least once with a fluid jet having a force greater than that used in the usual entangling treatment so that the long fibers in the long fiber web wherein fibers are entangled can be transferred and entangled with the short fibers.

As the fluid jet having a force greater than that used in a usual entangling treatment, a fluid jet having an E value of 10 or more, preferably 15 or more, more preferably 18 or more, most preferably 20 or more can be used. The E value is defined as $$E = R \cdot P^2$$

wherein R denotes a nozzle diameter (mm), and P denotes an internal pressure (MPa) in the nozzle. A nonwoven fabric containing a mixture layer wherein the short fibers and the long fibers are entangled can be produced by treating the laminate at least once with the above fluid jet. The above equation approximately defines a kinetic energy of a fluid jet, taking into account that this kinetic energy is proportional to a mass and square of a velocity, and therefore, that (1) when a fluid jet is ejected from the nozzle having a larger diameter, a mass of the resulting fluid jet is increased, and (2) when a fluid jet is ejected from a nozzle under the higher internal pressure, a velocity of the resulting fluid jet is increased.

The other fluid-entangling conditions are not particularly limited. For example, a nozzle plate containing one or more lines of nozzles having a diameter of 0.05 to 0.3 mm and a pitch of 0.2 to 3 mm may be used. The fluid-entangling (particularly hydro-entangling) treatment may be carried out once, twice or more times, if necessary, to one side or to both sides of the laminate. When the fluid-entangling treatment is carried out two or more times, the fluid jets wherein the sum of each of values E thereof is preferably 30 or more, more preferably 40 or more, further more preferably 60 or more, most preferably 80 or more, can be used. If the laminate is fluid-entangled (particularly hydro-entangled) on a support such as a net or a perforated panel containing large pores, the resulting entangled nonwoven fabric also has large pores. The alkaline battery made from such an entangled nonwoven fabric is liable to produce a short circuit. Therefore, it is preferable to use a square-weave or plain weave fabric net having fine pores (for example, a mesh opening of 0.295 mm or less), or a perforated panel having pore sizes of 0.295 mm or less.

When the short fiber web and/or long fiber web contain fusible fibers, a fusing treatment can be carried out in addition to the dividing treatment, which may be optionally carried out, and the entangling treatment. The dividing treatment may be carried out simultaneously with, or before or after the entangling treatment. The sequence in which the entangling treatment and the fusing treatment are carried out is not limited. The fusing treatment can enhance the tensile strength, tear strength, and bending resistance of the separator, and suppress the occurrence of short circuits.

The fusing treatment can be carried out by heating, for example, the entangled nonwoven fabric at a temperature which is higher than the softening point of the low-melting-point component in the fusible fibers, but lower than the melting point of each constitutional resin component of the dividable composite fiber, and lower than the melting point of the high-strength fiber. The fusing treatment can be carried out once, or more times if necessary. When the fusing treatment is carried out two or more times, each treatment may be conducted under the same conditions, or partially or wholly different conditions. When the fusing treatment is carried out two or more times, a first fusing step corresponds to, or two or more steps (including a first fusing step but excluding a final fusing step) correspond to the pre-fusing treatment. When the high-strength fiber used contains the ultra-high-strength polyethylene fiber, the fusing is preferably carried out at the temperature below a softening point of the ultra-high-strength polyethylene fiber, for example, below 125° C., to ensure that there is no weakening of the strength of the ultra-high-strength polyethylene fiber.

The sequence of the fusing treatment and the entangling treatment is not limited. The fused and entangled nonwoven fabric can be obtained by carrying out one treatment, and subsequently the other treatment, or one treatment and then the other treatment, and thereafter, the first treatment under the same conditions or partially or wholly different conditions. For example, it is possible to carry out first the pre-fusing treatment, then the fluid-entangling treatment, and thereafter the fusing treatment.

The fusing treatment can be carried out under pressure or without pressure, or first without pressure to fuse the low-melting-point component of the fusible fibers and then under pressure. It is preferable to fuse the low-melting-point component of the fusible fibers under pressure, or first without pressure to fuse the low-melting-point component of the fusible fibers and then under pressure, because the thickness can be thus controlled. A fusing apparatus which may be used is, for example, a heating-calender, a hot-air through-type heater, a cylinder contact heater or the like. When a heat is applied under pressure, the heating temperature preferably ranges from a softening temperature to a melting point of the low-melting-point component in the fusible fibers. When heat is applied, and thereafter pressure is applied, the heating temperature preferably ranges from a softening temperature of the low-melting-point component in the fusible fibers to a temperature which is 20° C. higher than the melting point of the low-melting-point component in the fusible fibers. In each case, the pressure applied is preferably a linear pressure of 5 to 30 N/cm.

When the short fiber web and/or long fiber web are composed mainly of polyolefin fibers, to thereby enhance resistance thereof to alkalis, an electrolyte-holding capacity can be enhanced by imparting a hydrophilic property in addition to the dividing treatment and/or fusing treatment, which may be optionally carried out, and the entangling treatment. The sequence in which the entangling treatment, dividing treatment, fusing treatment, and the treatment used for imparting a hydrophilic property are carried out is not limited. The treatment used for imparting a hydrophilic property may be, for example, a sulfonating treatment, a treatment with fluorine gas, a graft polymerization treatment with vinyl monomers, a treatment with a surface-active agent, a treatment to adhere hydrophilic resins, a discharging treatment, or the like.

The sulfonating treatment contains, for example, but is not limited to, a treatment with fuming sulfuric acid, sulfuric acid, sulfur trioxide, chlorosulfuric acid, sulfuryl chloride, or the like. Of these treatments, the sulfonating treatment with fuming sulfuric acid is preferable, because of a high reactivity and an easier sulfonation are obtained. The sulfonated separator has an advantage in that any self-discharging can be inhibited.

The treatment with fluorine gas contains, for example, but is not limited to, a treatment with a gas mixture of fluorine gas diluted with an inactive gas (such as nitrogen or argon gas) and at least one gas selected from the group consisting of oxygen, carbon dioxide and sulfur dioxide gases. The hydrophilic property can be effectively and permanently imparted by absorbing sulfur dioxide gas onto the nonwoven fabric, and then bringing the nonwoven fabric into contact with diluted fluorine gas.

Examples of the vinyl monomer which may be used in the graft polymerization treatment are acrylic acid, methacrylic acid, acrylate, methacrylate, vinyl pyridine, vinyl pyrrolidone, styrene, or the like. When styrene is grafted, it is preferable to further carry out the sulfonation treatment, to thereby impart an affinity with the electrolyte. Acrylic acid has a good affinity with an electrolyte and may be preferably used.

The vinyl monomers can be polymerized, for example, by dipping the nonwoven fabric in a solution containing the vinyl monomers and an initiator, and heating; by coating vinyl monomers on the nonwoven fabric and applying radiation; by applying radiation to the nonwoven fabric and then bringing the nonwoven fabric into contact with the vinyl monomers; or by applying the nonwoven fabric with a solution containing vinyl monomers and a sensitizing agent, and applying ultraviolet rays. The graft polymerization can be effectively carried out by treating the surface of the nonwoven fabric with ultraviolet radiation, a corona discharge or a plasma discharge before bringing the nonwoven fabric into contact with the vinyl monomer solution, to enhance the affinity thereof with the vinyl monomer solution and generate radicals through polar hydrophilic groups produced in the pre-treatment.

The treatment with a surface-active agent may be carried out by applying, for example, spraying or coating, a solution of an anionic surface-active agent (such as an alkali metal salt of a higher fatty acid, alkyl sulfonate, or a salt of sulfosuccinate) or a nonionic surface-active agent (such as polyoxyethylene alkyl ether, or polyoxyethylene alkylphenol ether) to the nonwoven fabric, or dipping the nonwoven fabric in the solution.

The treatment to adhere hydrophilic resins can be carried out by adhering hydrophilic resins such as carboxymethyl cellulose, polyvinyl alcohol, or polyacrylic acid, to the nonwoven fabric. The hydrophilic resins may be adhered to the nonwoven fabric, by spraying or coating a solution or dispersion of the hydrophilic resins in an appropriate solvent or dispersant, or dipping the nonwoven fabric in the solution or dispersion, and then drying.

Further, the treatment to adhere hydrophilic resins can be conducted by adhering cross-linked polyvinyl alcohols to the nonwoven fabric. The cross-linked polyvinyl alcohol can be formed, for example, by cross-linking a photosensitive polyvinyl alcohol substituted by a photosensitive group at a part of hydroxy groups, or an acylated derivative thereof prepared by acylating a part of the hydroxy groups of the photosensitive polyvinyl alcohol.

The cross-linked polyvinyl alcohols can be adhered to the nonwoven fabric, for example, by dissolving or dispersing the cross-linking photosensitive polyvinyl alcohols or the cross-linking photosensitive acylated polyvinyl alcohols, dipping the nonwoven fabric in the resulting solution or dispersion, or spraying or coating the resulting solution or dispersion on the nonwoven fabric, drying the solution or dispersion on the nonwoven fabric, and radiating with light to cause a cross-linking reaction.

Of known hydrophilic resins, cross-linked polyvinyl alcohols formed by cross-linking the photosensitive polyvinyl alcohols or photosensitive acylated polyvinyl alcohols having a photosensitive group such as styryl pyridinium, styryl quinolinium or a styryl benzthiazolinium group may be preferably used. This is not only because they have an excellent resistance to alkalis, but also because they contain many functional groups, i.e., hydroxyl groups, which can form a chelate with an ion, and thus the functional groups can form chelates with ions before the ions are deposited on electrodes in the form of branches, during charging and/or discharging, to thereby effectively prevent a short circuit between the electrodes. The amount of hydrophilic resins adhered is preferably 0.3 to 3 mass % with respect to the mass of the separator, to ensure that there is no effect on the air-permeability.

As the discharging treatment, there may be mentioned, for example, treatments with a corona discharge, plasma, glow discharge, surface discharge, or electron beams. Of the discharging treatments, the plasma treatment comprising the steps of placing the nonwoven fabric between a pair of electrodes carrying a dielectric layer on a surface facing the other electrode under atmospheric condition, i.e., in air under atmospheric pressure, so that the outer surfaces of the nonwoven fabric are brought into contact with both dielectric layers without coming into contact with the electrodes, and then applying an alternating current voltage between the electrodes to thereby induce an electric discharge in internal voids contained in the nonwoven fabric sandwiched between the electrodes, can be preferably conducted. This is because not only the outer surfaces, but also the insides of the nonwoven fabric can be effectively treated; the nonwoven fabric to be treated is hard to be damaged by a spark discharge or the like; and any kind of gases can be used for treating surfaces.

The density per unit area of the resulting alkaline battery separator of the present invention is preferably 30 to 100 g/m$^2$, more preferably 40 to 80 g/m$^2$. If the density per unit area is less than 30 g/m$^2$, a sufficient tensile strength may not be obtained. If the density per unit area is more than 100 g/m$^2$, the separator becomes too thick and thus the ratio of the separator in a battery becomes too high to obtain a battery with a high capacity. The thickness of the alkaline battery separator of the present invention is preferably 0.05 to 0.3 mm.

The lengthwise (longitudinal) tensile strength of the alkaline battery separator of the present invention is preferably 80 N/50 mm or more, more preferably 100 N/50 mm or more, to avoid any breakage of the separator by the tension generated during the step of assembling electrodes during battery production. The tensile strength is measured by setting a sample (width=50 mm) on a tensile tester (TENSILON UTM-III-100; manufactured by ORIENTEC, Co.), at a chuck-to-chuck distance of 100 mm and a pulling rate of 300 mm/min.

The lengthwise tear strength of the alkaline battery separator of the present invention is preferably 10 N/50 mm or more, more preferably 20 N/50 mm or more, most preferably 25 N/50 mm or more, to avoid a tearing of the separator by an edge of an electrode during the step of assembling electrodes during battery production. The tear strength is measured in accordance with JIS L 1096-1990 (a method for testing general textiles; trapezoidal tearing strength test).

The lengthwise bending resistance of the alkaline battery separator of the present invention is preferably 10 mg or more, more preferably 15 mg or more, to maintain the shape of the separator and avoid any winding-deviation during the step of assembling electrodes during battery production. The bending resistance is measured in accordance with JIS L 1096 [bending resistance; the A method].

The alkaline battery separator of the present invention has an excellent electrolyte-holding capacity, tensile strength, tear strength, and bending resistance, and can effectively avoid short circuiting. Therefore, a battery can be stably assembled using this separator. The alkaline battery separator of the present invention can be used in an alkaline primary battery such as an alkaline-manganese battery, a mercury battery, a silver oxide battery, an air battery, or the like, or an alkaline secondary battery, such as a nickel-cadmium battery silver-zinc battery, silver-cadmium battery, nickel-zinc battery, nickel-hydrogen battery or the like.

EXAMPLES

The present invention will now be further illustrated by, but is by no means limited to, the following Examples.

Example 1

A short fiber web (area density=30 g/m$^2$) was formed by a conventional wet-laid method from a slurry prepared by mixing and dispersing (1) 40 mass % of dividable composite short fibers (linear density=144 μg/m; fiber length=15 mm) having a cross-sectional structure as shown in FIG. 3, wherein polypropylene components (components 12 in FIG. 3) capable of producing fine fibers (linear density=8.9 μg/m; melting point=160° C.) and high-density polyethylene components (components 11 in FIG. 3) capable of producing fine fibers (linear density=8.9 μg/m; melting point=132° C.) radiated from the center portion, were divided into 8 portions, respectively, and a circular polypropylene component capable of producing a fine fiber (linear density=2.2 μg/m; melting point= 160° C.) was located in the center portion, (2) 35 mass % of high-strength polypropylene short fibers (linear density=222 μg/m; fiber length=10 mm; melting point =160° C.) having a single-fiber strength of 9 g/denier, and (3) 25 mass % of sheath-core (concentric) fusible short fibers (linear density=222 μg/m; fiber length=10 mm) composed of a core component of polypropylene and a sheath component of low-density polyethylene (melting point=115° C.).

A parallel-laid long fiber web (area density=20 g/m$^2$) was formed by mixing and opening with a card, (1) a 40 mass % of dividable composite long fibers having structures the same as those of the dividable composite short fibers, except that a fiber length was 25 mm, (2) a 35 mass % of high-strength polypropylene long fibers having structures the same as the high-strength polypropylene short fibers, except that a fiber length was 45 mm, and (3) a 25 mass % of fusible long fibers having structures the same as those of the fusible short fibers, except that the fiber length was 38 mm.

The resulting parallel-laid long fiber web and the resulting short fiber web were then laminated and heated at 120° C. for 10 seconds (pre-fusing treatment). The pre-fused nonwoven fabric was mounted on a plain weave net (mesh opening=0.175 mm), and the dividable fibers then were divided and the fibers were entangled with a water jet having a hydraulic pressure of 12 MPa, using a nozzle plate having a nozzle diameter of 0.15 mm and a pitch of 0.8 mm, wherein each side of the pre-fused nonwoven fabric was alternately treated twice. Thereafter, the entangled nonwoven fabric was heated at 120° C. for 10 seconds, and then calendered under a linear pressure of 9.8 N/cm, to fuse only the low-density polyethylene component of the fusible short fibers and fusible long fibers and thereby obtain a fused and entangled nonwoven fabric. The resulting fused and entangled nonwoven fabric was treated with fluorine gas, using a gas mixture of fluorine, oxygen and sulfur dioxide gases, to obtain the alkaline battery separator (area density= 50 g/m$^2$; thickness=0.12 mm) of the present invention.

Electron photomicrographs of the cross-section of the separator were taken to evaluate the entangled state, and it was found that the mixture layer had spread throughout the separator, from the top to the bottom thereof.

Example 2

The procedure disclosed in Example 1 was repeated, except that a two-layer laminate prepared by cross-laminating a parallel-laid long fiber web (area density=10 g/m$^2$) having a composition the same as that of the parallel-laid long fiber web used in Example 1 on a parallel-laid long fiber web (area density=10 g/m$^2$) having a composition the same as that of the parallel-laid long fiber web used in Example 1 by a cross-layering machine was used as the long fiber web, instead of the parallel-laid long fiber web (area density=20 g/m²), to obtain the alkaline battery separator (area density=50 g/m²; thickness=0.12 mm) of the present invention.

Electron photomicrographs of the cross-section of the separator were taken to evaluate the entangled state, and it was found that the mixture layer had spread throughout the separator, from the top to the bottom thereof.

Example 3

The procedure disclosed in Example 1 was repeated, except that the short fiber web (area density=40 g/m²) having a composition the same as that of the short fiber web used in Example 1 was used as the short fiber web, instead of the short fiber web (area density=30 g/m²), to obtain an alkaline battery separator (area density=60 g/m²; thickness=0.15 mm) of the present invention.

Electron photomicrographs of the cross-section of the separator were taken to evaluate the entangled state, and it was found that the mixture layer had spread throughout the separator, from the top to the bottom thereof.

Example 4

The procedure disclosed in Example 2 was repeated, except that the short fiber web (area density=40 g/m²) having a composition the same as that of the short fiber web used in Example 1 was used as the short fiber web, instead of the short fiber web (area density=30 g/m²), to obtain the alkaline battery separator (area density=60 g/m²; thickness=0.15 mm) of the present invention.

Electron photomicrographs of the cross-section of the separator were taken to evaluate the entangled state, and it was found that the mixture layer had spread throughout the separator, from the top to the bottom thereof.

Example 5

The procedure disclosed in Example 1 was repeated, except that a two-layer laminate prepared by cross-laminating a parallel-laid long fiber web (area density=15 g/m²) having a composition the same as that of the parallel-laid long fiber web used in Example 1 on a parallel-laid long fiber web (area density=15 g/m²) having a composition the same as that of the parallel-laid long fiber web used in Example 1 by a cross-layering machine was used as the long fiber web, instead of the parallel-laid long fiber web (area density=20 g/m²), to obtain the alkaline battery separator (area density=60 g/m²; thickness=0.15 mm) of the present invention.

Electron photomicrographs of the cross-section of the separator were taken to evaluate the entangled state, and it was found that the mixture layer had spread throughout the separator, from the top to the bottom thereof.

Example 6

The procedure disclosed in Example 1 was repeated, except that
  (A) a short fiber web (area density=35 g/m²) formed by a conventional wet-laid method from a slurry prepared by mixing and dispersing
    (1) 55 mass % of dividable composite short fibers used in Example 1,
    (2) 10 mass % of high-strength polypropylene short fibers used in Example 1, and
    (3) 35 mass % of the fusible short fibers, used in Example 1, was used as the short fiber web, and
  (B) a spun bonded web layer (area density=15 g/m²) of polypropylene (linear density=111 μg/m) was used as the long fiber (filament) web, to obtain the alkaline battery separator (area density=50 g/m²; thickness=0.12 mm) of the present invention.

Electron photomicrographs of the cross-section of the separator were taken to evaluate the entangled state, and it was found that the mixture layer had spread throughout the separator, from the top to the bottom thereof.

Example 7

The procedure disclosed in Example 1 was repeated, except that
  (A) the short fiber web (area density=30 g/m²) formed by a conventional wet-laid method from a slurry prepared by mixing and dispersing
    (1) 40 mass % of dividable composite short fibers (linear density=333 μg/m; fiber length=6 mm) having a cross-sectional structure, as shown in FIG. 1, and composed of polypropylene components (components 12 in FIG. 1) capable of producing fine fibers (linear density=20.8 μg/m; melting point 160° C.) and ethylene-vinyl alcohol copolymer components (components 11 in FIG. 1) capable of producing fine fibers (linear density=20.8 μg/m; melting point=160° C.) radiating from the center portion, and divided into 8 portions, respectively,
    (2) 35 mass % of high-strength polypropylene short fibers used in Example 1, and
    (3) 25 mass % of sheath-core (concentric) fusible short fibers (linear density=222 μg/m; fiber length=10 mm) composed of a core component of polypropylene and a sheath component of low-density polyethylene (melting point=115° C.) was used as the short fiber web,
  (B) the two-layer laminate (area density=20 g/m²) used in Example 2 was used as the long fiber web, and
  (C) the heat treatment was conducted at 125° C., to obtain an alkaline battery separator (area density=50 g/m²; thickness=0.12 mm) of the present invention.

Electron photomicrographs of the cross-section of the separator were taken to evaluate the entangled state, and it was found that the mixture layer had spread throughout the separator, from the top to the bottom thereof.

Example 8

The procedure disclosed in Example 7 was repeated, except that the short fiber web (area density=40 g/m²) having a composition the same as that of the short fiber web used in Example 7 was used as the short fiber web instead of the short fiber web used in Example 7, to obtain an alkaline battery separator (area density=60 g/m²; thickness=0.15 mm) of the present invention.

Electron photomicrographs of the cross-section of the separator were taken to evaluate the entangled state, and it was found that the mixture layer had spread throughout the separator, from the top to the bottom thereof.

Example 9

The procedure disclosed in Example 2 was repeated, except that
  (A) ultra-high-strength polyethylene short fibers (linear density=111 μg/m; fiber length=10 mm; melting point=

148° C.) having a single-fiber strength of 33 g/denier were used as the high-strength short fiber, and (B) the heat treatment was conducted at 115° C., to obtain an alkaline battery separator (area density=50 g/m$^2$; thickness=0.12 mm) of the present invention.

Electron photomicrographs of the cross-section of the separator were taken to evaluate the entangled state, and it was found that the mixture layer had spread throughout the separator, from the top to the bottom thereof.

Comparative Example 1

The procedure disclosed in Example 1 was repeated, except that (A) the short fiber web (area density=50 g/m$^2$) having a composition the same as that of the short fiber web used in Example 1 was used as the short fiber web instead of the short fiber web (area density=30 g/m$^2$), and (B) a long fiber web was not used, to obtain an alkaline battery separator (area density=50 g/m$^2$; thickness=0.12 mm) for comparison.

Comparative Example 2

The procedure disclosed in Example 1 was repeated, except that (A) the parallel-laid long fiber web (area density=50 g/m$^2$) having a composition the same as that of the long fiber web used in Example 1 was used as the long fiber web instead of the parallel-laid long fiber web (area density=20 g/m$^2$), and (B) a short fiber web was not used, to obtain an alkaline battery separator (area density=50 g/m$^2$; thickness=0.12 mm) for comparison.

Comparative Example 3

The procedure disclosed in Comparative Example 2 was repeated, except that polypropylene long fibers (linear density=222 μg/m; fiber length=45 mm; melting point=160° C.) having a single-fiber strength of 4 g/denier were used instead of the high-strength long fiber, to obtain an alkaline battery separator (area density=50 g/m$^2$; thickness=0.12 mm) for comparison.

Comparative Example 4

The short fiber web used in Example 1 was heated at 120° C. for 10 seconds, and then entangled with a water jet under the same conditions as those in Example 1 to obtain an entangled short fiber web. The parallel-laid long fiber web used in Example 1 was heated at 120° C. for 10 seconds, and then entangled with a water jet under the same conditions as those in Example 1 to obtain an entangled long fiber web. Then the entangled short fiber web and the entangled long fiber web were laminated. Thereafter, the procedure disclosed in Example 1 was repeated, except that the laminated fiber webs were entangled with a water jet having a hydraulic pressure of 1 MPa, to obtain an alkaline battery separator (area density=50 g/m$^2$; thickness=0.12 mm) for comparison.

Electron photomicrographs of the cross-section of the separator were taken to evaluate the entangled state, and it was found that the thickness of the mixture layer was much less than one-third of the whole thickness of the nonwoven fabric. Further, the layer of long fibers and the layer of short fibers were easily separated from each other by hand.

Evaluation of Properties (1) Lengthwise Tensile Strength

Each of the separators prepared in Examples 1 to 9 and Comparative Examples 1 to 4 was set on a tensile tester (TENSILON UCT-500; manufactured by ORIENTEC, Co.), and the lengthwise tensile strength was measured at a chuck-to-chuck distance of 100 mm and a pulling rate of 300 mm/min (width of each separator=50 mm). The results are shown in Table 1.

(2) Index of Resistance to Penetration

An index of resistance to penetration was measured by a handy-type compression tester (KES-G5; manufactured by KATO TECH Co., Ltd.). A laminate having a thickness of about 2 mm was formed from each of the alkaline battery separators prepared in Examples 1 to 9 and Comparative Examples 1 to 4. A stainless steel jig (thickness 0.5 mm; angle of the blade edge=60°) connected with the handy-type compression tester was thrust perpendicularly into the laminate from the top layer at a rate of 0.01 cm/s, and the force required to cut the top layer was measured. The ratio of the force required to cut the top layer of each separator to the standard force (100) required to cut the top layer of the separator prepared in Comparative Example 3 was recorded as the index (%) of resistance to penetration. The results are shown in Table 1.

(3) Lengthwise Tear Strength

The lengthwise tear strength of each of the separators prepared in Examples 1 to 9 and Comparative Examples 1 to 4 was measured in accordance with JIS L 1096-1990 (a method for testing general textiles; trapezoidal tearing strength test). The results are shown in Table 1.

(4) Lengthwise Bending Resistance

The lengthwise bending resistance of each of the separators prepared in Examples 1 to 9 and Comparative Examples 1 to 4 was measured in accordance with JIS L 1096 [bending resistance; the A method]. The results are shown in Table 1.

(5) Capacity for Holding an Electrolyte Under Pressure

Each of the alkaline battery separators prepared in Examples 1 to 9 and Comparative Examples 1 to 4 was cut to form a disc having a diameter of 30 mm. The disc was placed at 20° C. under a relative humidity of 65% so that the moisture content was equilibrated. Thereafter, the mass ($M_0$) was measured. Then, the disc was dipped in an aqueous potassium hydroxide solution having a specific gravity of 1.3 (at 20° C.) for 1 hour, to replace air in the disc with the potassium hydroxide solution. The disc holding the potassium hydroxide solution was sandwiched between six filter papers having a diameter of 30 mm (three papers on each side) and a pressure of 5.7 MPa was applied for 30 seconds by a pressure pump. Then the mass ($M_1$) of the pressed disc was measured. The capacity (X; %) for holding an electrolyte under pressure was calculated from the equation:

$$X=[(M_1-M_0)/M_0]\times 100$$

The average values obtained from four measurements for each alkaline battery separator are shown in Table 1.

(6) Short Circuit Ratio

Batteries were produced from alkaline battery separators prepared in Examples 1 to 9 and Comparative Examples 1 to 4. Cases wherein a short circuit was caused by an electrode flash and thus a viable battery was not produced, were counted as a ratio (%) of short circuiting. The results are shown in Table (7) Test of Cycle Lifetime The cycle lifetime was evaluated only for alkaline battery separators prepared in Examples 1, 2, 7, and 9 and Comparative Examples 1 and 4.

As a current collector of electrodes, a paste nickel positive electrode (width=33 mm; length=182 mm) prepared from a foamed nickel base, and a paste hydrogen-occluded alloy negative electrode (mesh metal alloy; width=33 mm; length=247 mm) were formed. Each of the alkaline battery separators prepared in Examples 1, 2, 7, and 9 and Comparative Examples 1 and 4 was cut into a separator sample (width=33 mm; length=410 mm). The separator sample was sandwiched between the positive and negative electrodes and rolled into a voluted form to obtain SC (sub-C) type electrodes. The electrodes were put into an outer container, 5N potassium hydroxide and 1N lithium hydroxide were poured in as electrolytes, and the container was sealed to obtain a cylindrical nickel-hydrogen battery.

For each of the cylindrical nickel-hydrogen batteries, a charging-discharging cycle consisting of charging at 0.2 C (coulomb) to 150%, and discharging at 1 C (coulomb) to a final voltage of 1.0 V was repeated. A charging-discharging lifetime was measured by judging that the charging-discharging lifetime was exhausted when the discharging capacity was lowered to 50% of the initial capacity. When the cycle number for the separator of Example 1 was regarded as a standard (100), the ratio of the cycle number for each separator are shown in Table 1.

(8) Test for Internal Pressure

The internal pressure was also evaluated only for alkaline battery separators prepared in Examples 1, 2, 7, and 9 and Comparative Examples 1 and 4. As in the "Test of cycle lifetime", the cylindrical nickel-hydrogen batteries were prepared, then the battery was charges at 0.5 C (coulomb) and 20° C., and the internal pressure of the battery at a capacity of 150% was measured. When the internal pressure for the separator of Example 1 was regarded as a standard (100), the ratio of the internal pressure for each separator are shown in Table 1.

TABLE 1

|   | A | B | C | D | E | F | G | H |
|---|---|---|---|---|---|---|---|---|
| [Examples] | | | | | | | | |
| 1 | 172 | 49 | 156 | 25.2 | 18 | 0.001–0.002 | 100 | 100 |
| 2 | 143 | 45 | 156 | 20.5 | 18 | 0.001–0.002 | 100 | 100 |
| 3 | 177 | 52 | 160 | 27.9 | 19 | 0.001–0.002 | | |
| 4 | 174 | 50 | 160 | 22.3 | 19 | 0.001–0.002 | | |
| 5 | 191 | 58 | 160 | 28.0 | 19 | 0.001–0.002 | | |
| 6 | 132 | 42 | 138 | 19.2 | 18 | 0.001–0.002 | | |
| 7 | 132 | 51 | 163 | 14.8 | 18 | 0.001–0.002 | 100 | 70 |
| 8 | 149 | 54 | 163 | 15.5 | 18 | 0.001–0.002 | | |
| 9 | 145 | 45 | 200 | 21.2 | 18 | 0.001–0.002 | 100 | 100 |
| [Comparative Examples] | | | | | | | | |
| 1 | 119 | 22 | 156 | 20.8 | 15 | 0.01–0.05 | 100 | 100 |
| 2 | 202 | 78 | 138 | 20.0 | 15 | 0.01–0.05 | | |
| 3 | 202 | 78 | 100 | 20.2 | 15 | 0.01–0.05 | | |
| 4 | 120 | 30 | 138 | 21.0 | 15 | 0.001–0.005 | 50 | 200 |

(A): Lengthwise tensile strength
(B): Tear strength
(C): Index of resistance to penetration
(D): Bending resistance
(E): Capacity for holding electrolyte under pressure
(F): Short circuit ratio
(G): Cycle lifetime
(H): Internal pressure

INDUSTRIAL APPLICABILITY

The alkaline battery separator of the present invention contains one or more mixture layers of entangled short fibers and entangled long fibers, wherein a fiber length of the short fibers is from 1 mm to less than 25 mm, a fiber length of the long fibers is 25 mm or more, and the short fibers and the long fibers are admixed. Therefore, a battery can be stably assembled using this separator, without fear of breakages. The separator has an excellent electrolyte-holding capacity, and further, has an excellent tensile strength, tear strength, and bending resistance. Also it is difficult for a flash of an electrode to penetrate the separator and cause a short circuit.

Although the present invention has been described with reference to specific embodiments, various changes and modifications obvious to those skilled in the art are deemed to be within the spirit, scope, and concept of the invention.

What is claimed is:

1. An alkaline battery separator comprising a non-woven fabric containing at least one mixture layer obtained by entangling short fibers and long fibers with a fluid jet, wherein
    the fiber length of said short fibers is from 1 mm to less than 25 mm,
    the fiber length of said long fibers is at least 25 mm,
    the total thickness of all of said mixture layers accounts for not less than one-third of the whole thickness of said non-woven fabric,
    the lengthwise tear strength of the non-woven fabric is at least 20 N/50 mm, and
    the non-woven fabric consists essentially of:
        (1) polyolefin fine short fibers, polyolefin fine long fibers, or a mixture thereof,
        (2) high strength short fibers, high strength long fibers, or a mixture thereof having a single-fiber strength of at least 5 g/denier, and
        (3) fusible short fibers, fusible long fibers, or a mixture thereof having at least on a surface thereof a resin component, the resin component having a melting lower than a melting point of the polyolefin fine fibers and lower than a melting point of the high strength fibers.

2. The alkaline battery separator according to claim 1, wherein said nonwoven fabric consists of said mixture layers.

3. The alkaline battery separator according to claim 1, wherein said nonwoven fabric has a hydrophilic property.

4. The alkaline battery separator according to claim 1, wherein said polyolefin fine fiber comprises a fiber polyethylene selected from the group consisting of polypropylene fibers polymethylpentene fibers, ethylene-propylene copolymer fibers, ethylene-butene-propylene copolymer fibers, ethylene-vinyl alcohol copolymer fibers and mixtures thereof.

5. The alkaline battery separator according to claim 1, wherein said high-strength fiber comprises a member selected from the group consisting of polypropylene fibers, polyethylene fibers and mixtures thereof.

6. The alkaline battery separator according to claim 1, wherein said high-strength fiber comprises a polyethylene fiber having a single-fiber strength of 25 g/denier or more.

7. The alkaline battery separator according to claim 1, wherein said high-strength fibers comprises from 30 to 45 mass % with respect to a total mass of the fibers of said nonwoven fabric.

8. The alkaline battery separator according to claim 1, wherein said fusible fiber comprises a polymer selected from the group consisting of polyethylene, polypropylene, polymethylpentee, ethylene-propylene copolymer, ethylene-butene-propylene copolymer and mixtures thereof, and said resin component has a melting point lower than the melting point of said polyolefin fine fiber and lower than the melting point of said high-strength fiber.

9. The alkaline battery separator according to claim 1, wherein said fusible fibers account for 20 to 35 mass % with respect to a total mass of the fibers of said nonwoven fabric.

10. The alkaline battery separator according to claim 3, wherein the hydrophilic property is imparted to said separator by a method selected from the group consisting of a sulfonating treatment, a treatment with fluorine gas, a graft polymerization treatment with vinyl monomers, a treatment with a surface-active agent, a treatment to adhere hydrophilic resins, an electric discharge treatment and combinations thereof.

11. The alkaline battery separator of claim 1 wherein the separator is formed by a process comprising forming a laminate comprising at least on non-woven fabric formed from short fibers and at least one non-woven fabric formed from long fibers and treating the laminate with a fluid jet to entangle the short fibers and the long fibers.

12. The alkaline battery separator of claim 1 wherein the separator is formed by a process comprising forming a laminate comprising at least one non-woven fabric formed from short fibers and at least one non-woven fabric formed from long fibers and treating the laminate with a fluid jet to entangle the short fibers and the long fibers.

13. The alkaline battery separator of claim 12 wherein the polyolefin fine fibers comprise a fiber selected from the group consisting of polyethylene fibers, polypropylene fibers, polymethylpentene fibers, ethylene-propylene copolymer fibers, ethylene-butene-propylene copolymer fibers, ethylene-vinyl alcohol copolymer fibers and mixtures thereof.

14. The alkali battery separator of claim 12 wherein said high strength fiber comprises a member selected from the group consisting of polyproplene fibers, polyethylene fibers and mixtures thereof.

15. The alkali battery separator of claim 14 wherein said high strength fiber comprises a polyethylene fiber having a single fiber strength of at least 25 g/denier.

16. The battery separator of claim 12 wherein said high strength fibers comprise from 30 to 45 mass % with respect to a total mass of the fibers of said non-woven fabric.

17. The alkaline battery separator of claim 12 wherein said fusible fiber comprises a polymer selected from the group consisting of polyethylene, polypropylene, polymethylpentene, ethylene-propylene copolymer, ethylene-butene-propylene copolymer and mixtures thereof, said resin component having a melting point lower than the melting point of said polyolefin fine fiber and lower than the melting point of said high-strength fiber.

18. The alkaline battery separator of claim 12 wherein the non-woven fabric has a hydrophylic property.

19. The alkali battery separator of claim 18, wherein the hydrophilic property is imparted to said separator by a method selected from the group consisting of a sulfonating treatment, a treatment with fluorine gas, a graft polymerization treatment with vinyl monomers, a treatment with a surface-active agent, a treatment to adhere hydrophilic resins, an electric discharge treatment and combinations thereof.

20. The alkaline battery separator according to claim 1, wherein only said fusible short fibers, fusible long fibers, or a mixture thereof are fused.

21. The alkaline battery separator according to claim 1, wherein said non-woven fabric comprises said high strength short fibers.

22. The alkaline battery separator according to claim 1, wherein said non-woven fabric comprises said polyolefin fine short fibers and said polyolefin fine long fibers.

23. The alkaline battery separator according to claim 1, wherein said non-woven fabric comprises said fusible short fibers and said fusible long fibers.

* * * * *

UNITED STATES PATENT AND TRADEMARK OFFICE
CERTIFICATE OF CORRECTION

PATENT NO. : 6,355,375 B2
DATED : March 12, 2002
INVENTOR(S) : Masano Tanaka

It is certified that error appears in the above-identified patent and that said Letters Patent is hereby corrected as shown below:

Column 20,
Lines 33-34, delete "melting lower" and substitute with -- melting point lower --
Lines 43-45, delete "a fiber polyethylene selected from the group consisting of polyproplene fibers polymethylpentene" and substitute with -- a fiber selected from the group consisting of polyethylene fibers, polypropylene fibers, polymethylpentene --

Column 21,
Line 14, delete "on" and substitute with -- one --
Lines 31 and 35, delete "alkali" and substitute with -- alkaline --

Column 22,
Line 15, delete "alkali" and substitute with -- alkaline --.

Signed and Sealed this

Third Day of February, 2004

JON W. DUDAS
*Acting Director of the United States Patent and Trademark Office*